April 19, 1960 E. P. FAIRBAIRN 2,933,560
TELECOMMUNICATION SYSTEMS
Filed June 14, 1954
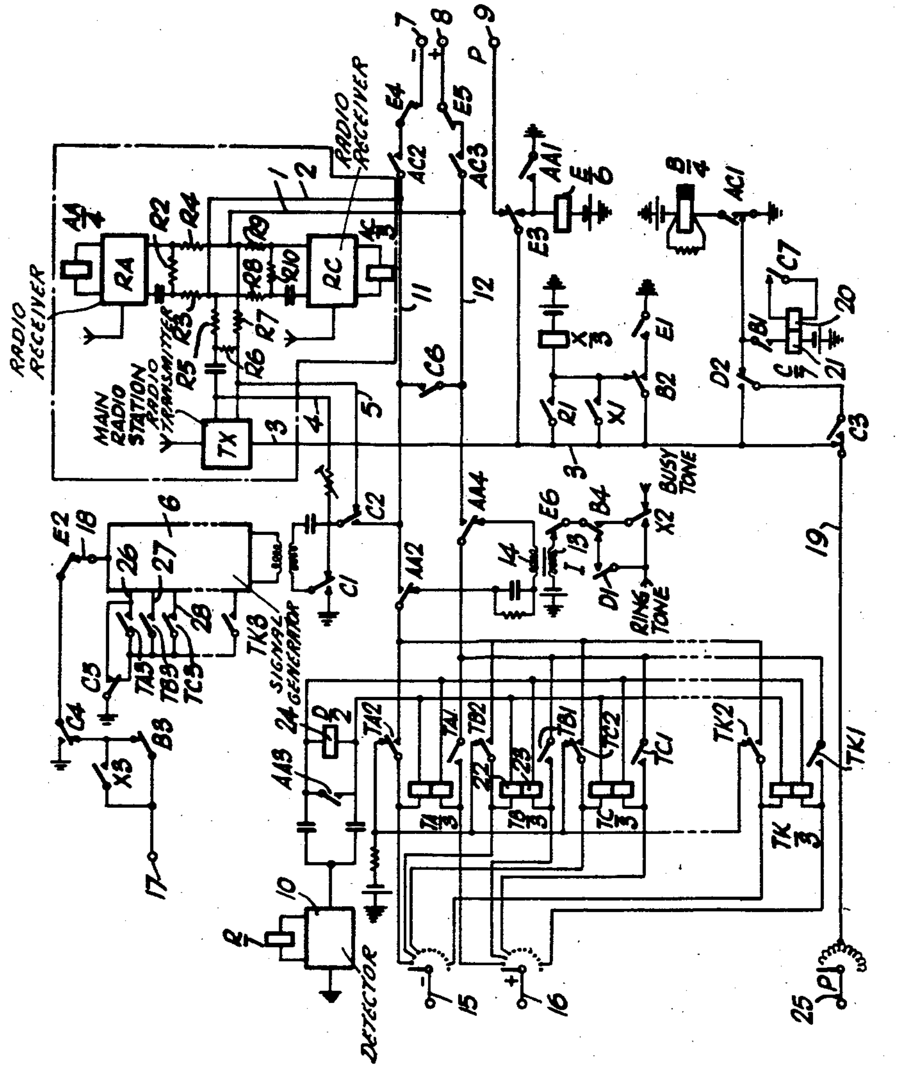
INVENTOR
ERIC PLAYFAIR FAIRBAIRN
ATTORNEY United States Patent Office 2,933,560 Patented Apr. 19, 1960

2,933,560

TELECOMMUNICATION SYSTEMS

Eric Playfair Fairbairn, Coventry, England, assignor to The General Electric Company Limited, London, England Application June 14, 1954, Serial No. 436,642

Claims priority, application Great Britain June 12, 1953

6 Claims. (Cl. 179—15)

The present invention relates to telecommunication systems.

The invention is more particularly concerned with such systems of the type in which a group of radio sub-stations, each having radio transmitting and receiving facilities, are arranged to work to a main radio station, the said main radio station being connected to an automatic telephone exchange.

Systems of the type described in which facilities are provided for inter-communication between any radio sub-station and any subscriber connected to an automatic telephone exchange are well known. It is thus possible for a radio sub-station caller to cause emission of a radio frequency carrier from his station by operation of the cradle switch on removal of his handset to initiate or answer a call. The said carrier is received by the main radio station, thereby causing engagement of a selector switch at the telephone exchange to which the said main station is connected by line wires. The caller may now dial the telephone number of the required subscriber thereby causing interruptions or modulations of the said carrier. These interruptions or modulations are translated into impulses at the main radio station and applied to the exchange selector switches so that the required subscriber is selected. A system of this kind has, however, the nature of a party line in that revertive calls, that is calls between two radio stations associated with the same main station, cannot readily be effected since lines incoming to the exchange from the main radio station must necessarily test "busy" to any subsequent call once the said line has been seized for call originating purposes.

It is an object of the present invention to provide a system of the type described with means for enabling a caller at any one of said group of radio sub-stations to obtain selective communication with any other sub-station of the same group.

According to the present invention, in a telecommunication system in which a group of radio sub-stations, each having radio transmitting and receiving facilities, are arranged to work to a main radio station, the said main radio station being connected to associated apparatus in an automatic telephone exchange, the arrangement is such that a caller at any one of the said sub-stations can set up a revertive call through the exchange to any other sub-station in the group.

Preferably it is arranged that when a revertive call is being set up, a first signal that is characteristic of the main radio station is received by said associated apparatus over the exchange switch or switches engaged in setting up the call, the said apparatus including a device which is responsive to the first signal being so received to cause a second signal that is characteristic of the wanted sub-station to be transmitted by the main radio station, thereby calling the wanted sub-station.

The said first signal may be derived from a suitable source included in said apparatus. The said source may also be adapted to originate the said second signal, which is characteristically different for each sub-station in the group. Preferably the signals corresponding to said second signal are constituted each by a different frequency oscillation.

In the case of a revertive call it may be arranged that communication between a calling sub-station and the called sub-station proceeds independently of the exchange switch or switches engaged in setting up the call. It may also be arranged that the said switch or switches are released when a person at the called sub-station answers said revertive call.

Usually not more than ten radio substations are arranged to work to a said main radio station and a lower figure may be necessary if the calling rate is high.

When requirements are such that it is necessary to provide two or more groups of radio sub-stations, each group is arranged to work to a different main radio station connected to said automatic telephone exchange. Each main radio station has apparatus individual thereto which is arranged to be responsive to a signal characteristic of that station, the said main stations being thus identified each by a different signal for the purpose of revertive calling.

One example of a telecommunication system in accordance with the present invention will now be described with reference to the accompanying drawing, which shows the circuit of part of an automatic telephone exchange and of a main radio station which provides one terminal of a radio link to a group of ten sub-stations. The arrangement is such that duplex communication is possible between any subscriber connected to the exchange and any of the sub-stations, or alternatively between any pair of sub-stations.

Referring to the drawing the main radio station comprises a radio transmitter TX and two radio receivers RA and RC and is connected to the associated apparatus in the automatic telephone exchange over the line wires 1 and 2, the lead 3 and the signal wires 4 and 5. It is arranged that when the lead 3 is earthed the transmitter TX radiates a carrier of frequency F2 to which the receivers of all the radio sub-stations in the group are tuned.

The apparatus is arranged to be connected on the one side to outlets of a final selector switch of the automatic telephone exchange which correspond to the telephone numbers of the sub-stations in the group, and on the other side to an exchange line circuit by way of the terminals 7, 8 and 9.

It is arranged that when a person at a radio sub-station in the group lifts his handset to initiate a call, his radio transmitter (not shown) radiates a carrier of frequency F1 to which the receiver RC is tuned. Similarly when a person at a sub-station in the group lifts his handset to answer a call it is arranged that his radio transmitter (not shown) radiates a carrier of frequency F4 to which the receiver RA is tuned.

The output from either of the receivers RA or RC is fed to the transmitter TX through the network formed by the resistors R2 to R10, and thereby modulates the carrier frequency F2 of this transmitter, so that a radio sub-station receives side tone during a call. The level of this side tone may be set as required by a suitable choice of values for the resistors R2 to R10.

The carrier frequency F2 of the transmitter TX may be modulated, as hereinafter described, by any one of ten sub-stations calling signals, these signals being constituted each by a different frequency oscillation. The calling signals are derived from a signal generator 6 and applied to the transmitter TX over the wires 4 and 5.

One of the calling signals, a signal of the frequency F3, is also characteristic of the main radio station, and it is arranged that, during the setting up of a call from a radio sub-station in the group, this signal is selected at the signal generator 6, and applied to the exchange line circuit. If the call is revertive the signal of frequency F3 traverses the exchange switches employed in setting up the call and appears back at the final selector whence it is applied to a signal detector 10 via the operating windings of one of the relays TA, TB, TC or the like, these relays being associated one with each sub-station of said group. The signal detector 10 is arranged to operate relay R on receipt of a signal of frequency F3.

When a caller at a radio sub-station in the group lifts his handset to initiate a call, his transmitter (not shown) radiates its carrier of frequency F1. This carrier is received at the main radio station by the receiver RC and causes the relay AC to be operated.

On the relay AC operating:

The contacts AC1 complete the operating circuit of the relay B.

The contacts AC2 and AC3 loop the exchange line circuit to the main radio station over the line wires 1 and 2 and thus seize a free first selector (not shown) at the exchange. Upon seizure of said first selector earth is returned over the exchange line circuit "P" wire to the lead 3 and the transmitter TX commences to radiate its carrier frequency F2. It is arranged that this carrier locks out all other sub-stations in the group and thus prevents their initiating a call.

On the relay B operating:

The contacts B1 prepare an operating circuit for the relay C.

The contacts B2 prevent operation of the relay X.

The contacts B3 have no function at this stage.

The contacts B4 connect "busy" tone to the winding 13 of the transformer I.

When the sub-station caller dials a telephone number the carrier frequency F1 is interrupted or modulated accordingly. The relay AC responds to each of these interruptions or modulations by releasing momentarily. The contacts AC2 and AC3 open and close accordingly, thereby causing trains of impulses to be applied to the exchange line circuit. These impulses set the exchange selector switches in known manner and if the number dialled corresponds to a subscriber connected to the exchange a connection is established to that subscriber.

At the commencement of each impulse train the contacts AC1 complete the operating circuit for the relay C.

On the relay C operating:

The contacts C7 short circuit winding 20 of the relay C which consequently holds operated for a short time after the conclusion of each impulse train.

The contacts C4 complete a circuit to start the signal generator 6 by earthing the lead 18.

The contacts C5 earth the lead 26 thereby selecting the signal of frequency F3.

The contacts C6 short circuit the lines 11 and 12 and in conjunction with the contacts C1 and C2 apply the signal of frequency F3 to the terminals 7 and 8 and hence to the positive and negative line wires of the exchange line circuit in parallel. This signal is balanced as regards the two line wires 1 and 2 and is not therefore radiated by the transmitter TX, neither does it cause cross talk on other lines of the exchange.

The contacts C3 disconnect the exchange line circuit "P" wire from the contacts of the final selector "P" bank. Consequently the final selector will test "free" to a call incoming from the exchange during the release periods of the relay C, both between the trains of impulses and at the conclusion of impulsing.

If, during one of these "free" periods, the final selector switch is dialled to a position corresponding to the telephone number of a sub-station in the group, then the relay associated with that number, such as the relay TA, and the relay D which is common to all such relays, will operate from the final selector battery feed circuit over the lines 15 and 16.

Assuming that the relays TA and D are thus operated, the contacts TA1 and TA2 switch the calling lines 15 and 16 through to the winding 14 and the transformer I. Since the contacts E6 and X2 are normal and the contacts B4 operated, "busy" tone is returned to the caller.

The contacts TA3 prepare a circuit to select the appropriate calling signal.

On the relay D operating:

The contacts D1 have no function at this stage.

The contacts D2 break the operating circuit of the relay C.

In the normal course of events the caller using the final selector will restore his handset when he hears "busy" tone and consequently release the said selector. However, if the sub-station caller releases first with the consequent release of the relays AC and B then the contacts B2 will complete an operating circuit for the relay X.

On the relay X operating:

The contacts X1 complete a holding circuit for the relay X.

The contacts X2 connect "ring" tone to the calling lines 15 and 16 via the transformer I.

The contacts X3 connect the "interrupted" earth, that is supplied to the terminal 17, to the lead 18 thereby completing an operating circuit for the signal generator 6.

The calling signal selected by the contacts TA3, which in this case is the signal of frequency F3, is applied over the contacts C1 and C2 to the transmitter TX and modulates the carrier frequency F2 of this transmitter in accordance with the periods of the interrupted earth applied to the signal generator 6 thereby calling the wanted sub-station. The momentary operation of the relay C between the release of the relays AC and B merely delays the modulation of the carrier frequency F2 for a short time.

If the sub-station caller dials a number which corresponds to another sub-station in the same group, that is, if the call is revertive, the final selector positions its wipers to the bank contacts corresponding to the required sub-station during the "free" period provided by the release time of the relay C at the conclusion of impulsing. When this occurs the final selector "P" wire 25 is earthed, thereby completing an operating circuit for the relay C which consequently holds operated. The relay associated with the telephone number of the wanted sub-station, TB say, and the common relay D operates from the final selector battery feed circuit.

On the relay TB operating:

The contacts TB1 and TB2 connect the calling lines 15 and 16 through to the winding 14 of the transformer I.

The contacts TB3 prepare a circuit to select the calling signals characteristic of the wanted sub-station.

On the relay D operating:

The contacts D1 have no function at this stage.

The contacts D2 break the operating circuit of the relay C but this relay holds operated for a short time due to the short circuit of its winding 20.

The signal of frequency F3 is returned, via the final selector and the operating windings 22 and 23 of the relay TB, to the signal detector 10 thereby causing the relay R to operate.

On the relay R operating:

The contacts R1 complete a circuit to operate the relay X.

On the relay X operating:

The contacts X1 complete a circuit to hold the relay X operated.

The contacts X2 connect "ring" tone to the winding 13 of the transformer I and hence to the calling lines 15 and 16.

The contacts X3 prepare a start circuit for the signal generator 6 ready for the release of the relay C.

On the relay C releasing:

The contacts C1 and C2 connect the output from the signal generator 6 to the signal wires 4 and 5, thereby modulating the carrier frequency F2 of the transmitter TX accordingly.

The contacts C3 earth the final selector "P" bank contacts thereby rendering the final selector engaged.

The contacts C4 complete a circuit to start the signal generator 6 from the "interrupted" earth at the terminal 17.

The contacts C5 disconnect earth from the lead 26 and the signal of frequency F3 ceases. These contacts also act in conjunction with the contacts TB3 to select the appropriate sub-station calling signal by earthing the lead 27.

The contacts C6 short circuit the lines 11 and 12 and hence the exchange line circuit.

The contacts C7 have no function at this stage.

The carrier frequency F2 of the transmitter TX is thus modulated by the calling signal selected by the contacts TB3 in accordance with the periods of the "interrupted" earth, thereby calling the wanted sub-station. The carrier frequency F2 also acts to switch the called sub-station transmitter from a frequency F1 to a frequency F4, so that when a person at the wanted sub-station lifts his handset to answer the call his transmitter (not shown) radiates a carrier of frequency F4. This carrier of frequency F4 is received by the main station receiver RA and causes the relay AA associated therewith to be operated.

On the relay AA operating:

The contacts AA1 complete a circuit to operate relay E.

The contacts AA2 and AA4 disconnect "ring" tone from the calling lines 15 and 16.

The contacts AA4 short circuit the operating winding 24 of the relay D.

On the relay E operating:

The contacts E1 connect earth to the line 3 ready for the subsequent release of all the exchange switches employed in setting up the call.

The contacts E2 disconnect earth from the lead 18 thereby switching off the signal generator 6.

The contacts E3 complete a circuit to hold the relay E operated.

The contacts E4 and E5 open and break the exchange line circuit loop and all switches employed in setting up the call release.

A revertive call thus proceeds independently of the exchange switches, which may therefore be employed for other calls. The apparatus continues to be held until both parties release by replacing their handsets. When this occurs the sub-station transmitters (not shown) cease radiating their carrier frequencies F1 and F4 and the relays AA and AC consequently release.

On the relay AA releasing:

The contacts AA1 disconnect one earth from the lead 3.

The remaining contacts AA2, AA3 and AA4 have no function at this stage.

On the relay AC releasing:

The contacts AC1 break the operating circuit of the relay B which releases and complete a circuit to operate the relay C momentarily.

The contacts AC2 and AC3 open and thus prevent seizure of a first selector switch over the exchange line circuit on the subsequent release of the relay E.

On the relay B releasing:

The contacts B1 break the operating circuit of the relay C.

The contacts B2 disconnect earth from the lead 3. The relay E consequently releases and the transmitter TX stops radiating its carrier frequency F2, thereby enabling any one of the sub-stations in the group to initiate a call.

The contacts B3 prepare a start circuit for the signal generator 6.

The contacts B4 have no function at this stage.

On the relay E releasing:

The contacts E2 complete an operating circuit for the signal generator 6, preparatory for its use in conjunction with a subsequent call.

The remaining contacts associated with this relay have no function at this stage.

It is found desirable to have both the relay AA and the relay AC controlling the release of a revertive call to ensure that both radio substations have restored to normal before a subsequent call is initiated.

In the case of a non-revertive call from a radio substation, release of the exchange switches take place in known manner when the exchange line circuit loop is broken by the contacts AC2 and AC3 restoring.

If the final selector is dialled on to the number of the wanted sub-station in the group by a subscriber connected to the telephone exchange, then, assuming that no other call involving a sub-station in the group is in progress, earth is extended from the final selector "P" wire 25 to the lead 19 and hence to the lead 3 over the contacts C3. This causes the transmitter TX to radiate its carrier frequency F2. The relay associated with the wanted sub-station, such as the relay TC, and the common relay D are operated from the final selector battery feed circuit over the lines 15 and 16.

On the relay TC operating:

The contacts TC1 and TC2 connect the calling lines 15 and 16 through to the winding 14 of the transformer I.

The contacts TC3 select the calling signal characteristic of the wanted sub-station by earthing the lead 28. This signal modulates the carrier frequency F2 in accordance with the periods of the interrupted earth on the terminal 17 thereby calling the wanted sub-station.

On the relay D operating:

The contacts D1 connect "ring" tone to the calling lines 15 and 16 via the transformer I.

The contacts D2 have no function at this stage.

When a person at the wanted sub-station answers, his transmitter (not shown) radiates a carrier frequency F4, this is received by the receiver RA at the main station and the relay AA consequently operates.

On the relay AA operating:

The contacts AA1 complete a circuit to operate the relay E.

The contacts AA2 and AA4 extend the calling lines 15 and 16 through to the main radio station over the lines 1 and 2.

The contacts AA3 short circuit the operating winding 24 of the relay D which releases.

On the relay E operating:

The contacts E2 disconnect "interrupted" earth from the lead 18 thereby stopping the signal generator 6.

The contacts E3 complete a circuit to hold the relay E operated.

The contacts E6 disconnect "ring" tone from the winding 13 to the transformer I and hence from the calling lines 15 and 16.

The remaining contacts of this relay have no function at this stage.

The call may now proceed.

On completion of the call, the calling subscriber replaces his handset. This operation breaks his line circuit loop and causes the release of the switch or switches employed in setting up the call. Subsequent connection to the apparatus is prevented until the relay AA releases and the contacts AA1 open thereby removing earth from the final selector "P" bank contacts. The release of the relay AA is effected by the termination of the carrier frequency F4 on the called party replacing his handset.

If it is necessary to provide two or more groups of radio sub-stations, each group is arranged to work to a different main radio station connected to the automatic telephone exchange. Associated with each main radio station is apparatus individual thereto and the several main radio stations are identified, for the purpose of revertive calling, each by a different signal that is characteristic thereof, such as the signal of frequency F3.

Such an arrangement will usually necessitate the allocation of different radio frequency carriers for each of the main radio stations although the same calling signals may be employed one for each sub-station of each group.

I claim:

1. Terminal equipment for use in a telecommunication system to extend the two-way telephone service provided by an automatic telephone exchange to a plurality of radio sub-stations, each having radio transmitting and receiving facilities and each arranged to transmit on a first frequency during a call from the exchange and on a second frequency during a call originated from the sub-station, the terminal equipment comprising a first two-way speech circuit, a second two-way speech circuit, a plurality of outlets, automatic switching means to connect said first speech circuit selectively to any one of said outlets in response to an impulsing signal supplied to said first speech circuit, means to generate a plurality of different sub-station calling signals that are each characteristic of a different one of the said outlets, a first radio receiver tuned to the first frequency, a second radio receiver tuned to the second frequency, a radio transmitter tuned to a third frequency, means to select automatically the calling signal characteristic of any said outlet to which said first speech circuit is connected by said switching means, means to modulate the output of the transmitter with a calling signal thus selected, first test means connected to said first receiver to detect the reception of said first frequency by that receiver, second test means connected to said second receiver to detect the reception of said second frequency by that receiver and circuit means which is under the control of said first test means to connect automatically at least said first receiver and said transmitter to a selected outlet when said first frequency is detected and which is under the control of said second test means both to connect automatically at least said second receiver and said transmitter to said second speech circuit when said second frequency is detected and to supply to said second speech circuit impulsing signals comprising series of electric impulses when corresponding series of interruptions in said second frequency are detected.

2. A telecommunication system in which there is provided terminal equipment according to claim 1 to extend the two-way telephone service provided by an automatic telephone exchange to a plurality of radio sub-stations, each having radio transmitting and receiving facilities and each arranged to transmit on the first frequency during a call from the exchange and on the second frequency during a call originated from the sub-station, the said automatic switching means being a selector switch of the said exchange and the said second speech circuit being connected to a line circuit of the said exchange.

3. Terminal equipment for use in a telecommunication system to extend the two-way telephone service provided by an automatic telephone exchange to a plurality of radio sub-stations, each having radio transmitting and receiving facilities and each arranged to transmit on a first frequency during a call from the exchange and on a second frequency during a call originated from the substation, the terminal equipment comprising a first two-way speech circuit, a second two-way speech circuit, a plurality of outlets, automatic switching means to connect said first speech circuit selectively to any one of said outlets in response to an impulsing signal supplied to said first speech circuit, means to generate a plurality of different sub-station calling signals that are each characteristic of a different one of the said outlets, means to generate a reverting call signal that is characteristic of said terminal equipment, a first radio receiver tuned to the first frequency, a second radio receiver tuned to the second frequency, a radio transmitter tuned to a third frequency, means connected to said outlets to select automatically the calling signal characteristic of any said outlet to which said first speech circuit is connected by said automatic switching means, means to modulate the output of the transmitter with a calling signal thus selected, first test means connected to said first receiver to detect the reception of said first frequency by that receiver, second test means connected to said second receiver to detect the reception of said second frequency by that receiver, circuit means which is under the control of said first test means to connect automatically at least said first receiver and said transmitter to a selected outlet when said first frequency is detected and which is under the control of said second test means both to connect automatically at least said second receiver and said transmitter to said second speech circuit when said second frequency is detected and to supply to said second speech circuit impulsing signals comprising series of electric impulses when corresponding series of interruptions in said second frequency are detected, supervisory means under the control of said second test means to supply automatically said reverting call signal to said second speech circuit when series of interruptions in said second frequency are detected, third test means connected to said outlets to detect the supply of said reverting call signal to any one of those outlets that is connected to said first speech circuit by said automatic switching means, and means under the control of both said third test means and said second test means to prevent the output of the transmitter from being modulated with the calling signal characteristic of any one of said outlets when said second frequency is detected by said second test means unless said reverting call signal is also detected by said third test means.

4. A telecommunication system in which there is provided terminal equipment according to claim 3 to extend the two-way telephone service provided by an automatic telephone exchange to a plurality of radio substations, each having radio transmitting and receiving facilities and each arranged to transmit on the first frequency during a call from the exchange and on the second frequency during a call originated from the substation, the said automatic switching means being a selector switch of the said exchange and the said second speech circuit being connected to a line circuit of the said exchange.

5. Terminal means according to claim 3 in which the same means is employed to generate both said plurality of calling signals and said reverting call signal, said calling signals being constituted each by a different frequency oscillation and said reverting call signal being an oscillation of frequency equal to that of one of said calling signals.

6. A telecommunication system in which there is provided terminal equipment according to claim 3 to enable a plurality of radio sub-stations, each having radio transmitting and receiving facilities, to work to an automatic telephone exchange, the said selective switching means being a selector switch of the said exchange and the said outgoing line being connected to a line circuit of the said exchange.

(References on following page)

References Cited in the file of this patent

UNITED STATES PATENTS

| | | |
|---|---|---|
| 2,289,048 | Sandalls | July 7, 1942 |
| 2,510,271 | Almquist | June 6, 1950 |
| 2,510,273 | Barstow et al. | June 6, 1950 |
| 2,604,544 | Dillon et al. | July 22, 1952 |
| 2,626,319 | Cheek et al. | Jan. 20, 1953 |
| 2,721,897 | Schneckloth | Oct. 25, 1955 |
| 2,721,935 | Dorff | Oct. 25, 1955 |
| 2,733,296 | Maggio | Jan. 31, 1956 |